(12) United States Patent
LeFevre et al.

(10) Patent No.: US 11,912,045 B2
(45) Date of Patent: Feb. 27, 2024

(54) SYSTEM AND METHOD FOR PRINTING COLOR IMAGES ON SUBSTRATES IN AN INKJET PRINTER

(71) Applicant: Xerox Corporation, Norwalk, CT (US)

(72) Inventors: Jason M. LeFevre, Penfield, NY (US); Seemit Praharaj, Webster, NY (US); Douglas K. Herrmann, Webster, NY (US); Chu-Heng Liu, Penfield, NY (US); Jorge A. Alvarez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 182 days.

(21) Appl. No.: 17/656,407

(22) Filed: Mar. 24, 2022

(65) Prior Publication Data

US 2023/0302833 A1    Sep. 28, 2023

(51) Int. Cl.
*B41J 29/393* (2006.01)
*B41J 2/21* (2006.01)

(52) U.S. Cl.
CPC .......... *B41J 29/393* (2013.01); *B41J 2/2135* (2013.01); *B41J 2/2139* (2013.01)

(58) Field of Classification Search
CPC ...... B41J 2/2139; B41J 29/393; B41J 2/2142; B41J 2/2135; B41J 11/46; B41J 2/0451; B41J 2029/3935; B41J 2202/20
See application file for complete search history.

(56) References Cited

U.S. PATENT DOCUMENTS

| | | |
|---|---|---|
| 8,005,378 B2 | 8/2011 | Sheflin et al. |
| 8,376,503 B1 | 2/2013 | Wu et al. |
| 9,044,960 B2 | 6/2015 | Mizes et al. |
| 2002/0012018 A1 | 1/2002 | Ohtsuka et al. |
| 2003/0092796 A1 | 5/2003 | Tsao et al. |
| 2004/0021732 A1 | 2/2004 | Bergen |
| 2008/0143776 A1 | 6/2008 | Konno et al. |
| 2008/0292368 A1 | 11/2008 | Baretsky et al. |
| 2009/0086231 A1 | 4/2009 | Marumoto |
| 2010/0245446 A1 | 9/2010 | Nishikori et al. |
| 2011/0080615 A1 | 4/2011 | Ono et al. |
| 2011/0181897 A1 | 7/2011 | Noguchi et al. |
| 2013/0084439 A1 | 4/2013 | Ojiro et al. |
| 2013/0222455 A1* | 8/2013 | Wu .................. B41J 2/2139 347/14 |
| 2014/0139851 A1* | 5/2014 | Mizes ............... B41J 29/393 358/1.9 |
| 2015/0138268 A1 | 5/2015 | Chen et al. |

* cited by examiner

*Primary Examiner* — Jannelle M Lebron
(74) *Attorney, Agent, or Firm* — Maginot Moore & Beck LLP (57) ABSTRACT

A method of operating a printer evaluates the effect of printing a print job with two different orientations of the image content data for the print job. The orientation that produces the least increase in the cross-process direction displacement error for the inkjets in the printer is selected for printing the print job. By attenuating the increase in cross-process direction displacement error, the interval between printhead maintenance operations is increased.

20 Claims, 9 Drawing Sheets

SYSTEM AND METHOD FOR PRINTING COLOR IMAGES ON SUBSTRATES IN AN INKJET PRINTER

TECHNICAL FIELD

This disclosure relates generally to devices that produce ink images on media, and more particularly, to the image quality of the images produced by such devices.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Figure 7:
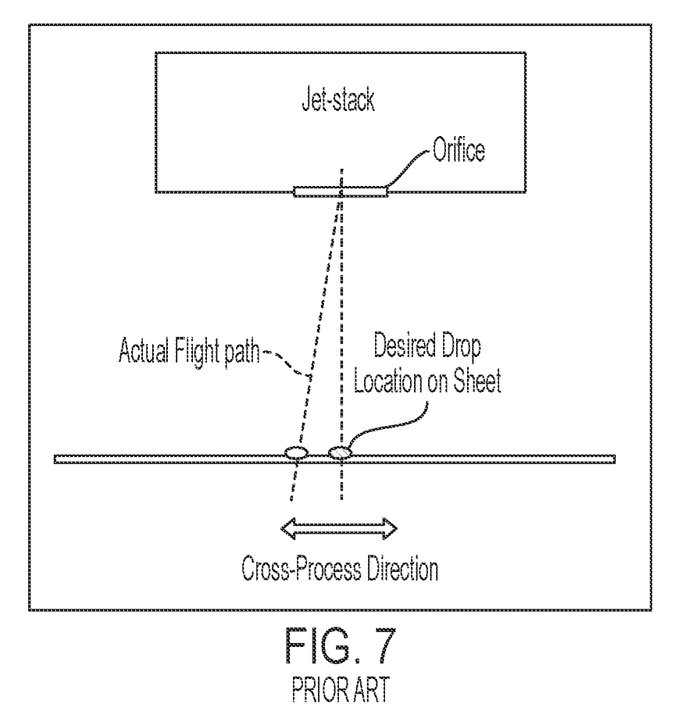
FIG. 7 illustrates cross-process direction displacement error for an inkjet in a printhead.
Figure 8A:
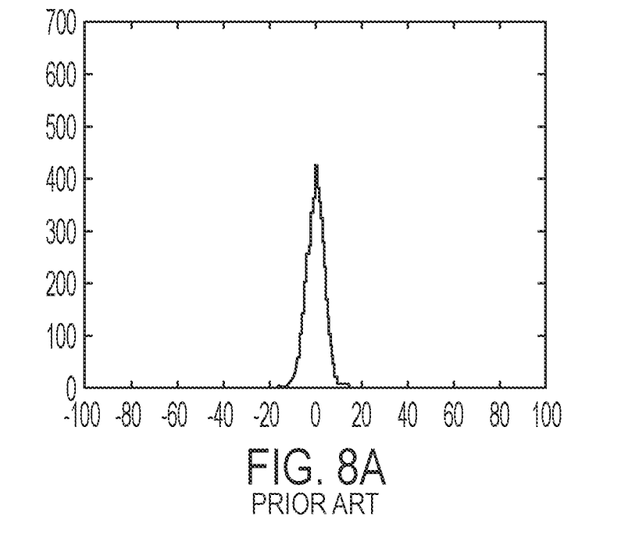
FIG. 8A and FIG. 8B are histograms demonstrating that cross-process displacement error in a function of ink throughput in a printhead as the printhead corresponding to FIG. 8A has had less ink ejected from it than the printhead corresponding to FIG. 8B.
Figure 8B:
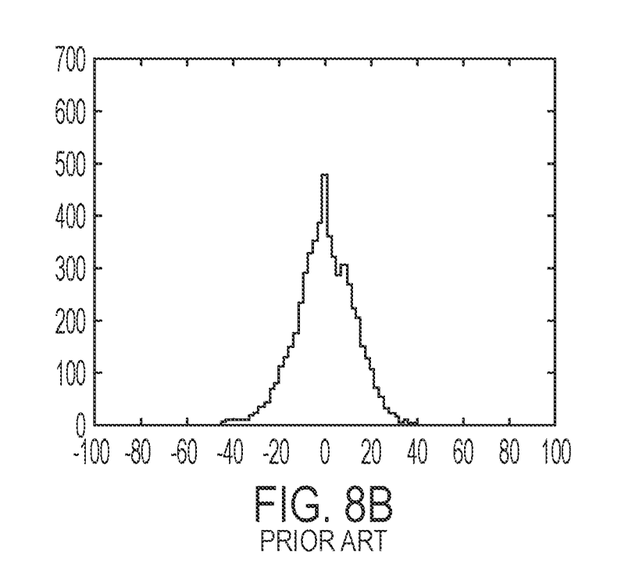

High quality prints require precise positioning of the ink drops ejected from the printheads. One issue adversely impacting image quality is streakiness. Streakiness can be caused by inkjets that eject ink drops along paths that deviate from the normal between the nozzle of the inkjet and the image receiving surface in the cross-process direction as shown in FIG. 7. As shown in FIGS. 8A and 8B, as the ink throughput through an inkjet increases so does the cross-process direction error increase for the inkjet. If the cross-process direction error increases for enough inkjets to a level where streakiness is exhibited, then printhead maintenance must be performed. Printhead maintenance usually includes the purging of ink through the inkjets of each printhead and the wiping of the faceplates of the printheads to remove the purged ink. The purged ink is, in effect, wasted ink since it is not used for the production of customer images. Developing inkjet color printers that attenuate the likelihood that inkjets develop cross-process direction errors that require printhead maintenance would be beneficial.

SUMMARY

A method of operating a color inkjet printer to reduce the likelihood of inkjets developing cross-process direction error that requires printhead maintenance. The method of operating the color inkjet printer having at least one printhead includes receiving image content data for a print job, identifying a first number of inkjet operations for each inkjet in the at least one printhead to print media sheets using the image content data for the print job in a first orientation, identifying a second number of inkjet operations for each inkjet in the at least one printhead to print media sheets using the image content data for the print job in a second orientation, identifying a first magnitude of cross-process direction displacement error using the first number of inkjet operations and a cross-process direction displacement error previously measured for each inkjet, identifying a second magnitude of cross-process direction displacement error using the second number of inkjet operations and the cross-process direction displacement error previously measured for each inkjet, and operating the at least one printhead with the orientation of the image content data associated with the smallest magnitude.

An inkjet printer is configured to reduce the likelihood of inkjets developing cross-process direction error and the resulting streakiness. The color inkjet printer includes at least one printhead, a media transport configured to move media sheets past the at least one printhead, an image sensor configured to generate image data of one of the media sheets after the one media sheet has passed the at least one printhead, and a controller operatively connected to the image sensor, the at least one printhead, and the media transport. The controller is configured to receive image content data for a print job, identify a first number of inkjet operations for each inkjet in the at least one printhead to print media sheets using the image content data for the print job in a first orientation, identify a second number of inkjet operations for each inkjet in the at least one printhead to print media sheets using the image content data for the print job in a second orientation, identify a first magnitude of cross-process direction displacement error using the first number of inkjet operations and a cross-process direction displacement error previously measured for each inkjet, identify a second magnitude of cross-process direction displacement error using the second number of inkjet operations and the cross-process direction displacement error previously measured for each inkjet, and operate the at least one printhead with the orientation of the image content data associated with the smallest magnitude.

A system of color inkjet printers is configured to reduce the likelihood of inkjets developing cross-process direction error in each inkjet printer within the system. The system includes a plurality of inkjet printers and a system controller. Each inkjet printer in the plurality of inkjet printers includes at least one printhead, a media transport configured to move media sheets past the at least one printhead, an image sensor configured to generate image data of one of the media sheets after the one media sheet has passed the at least one printhead, and a controller operatively connected to the image sensor, the at least one printhead, and the media transport. The controller in each inkjet printer in the plurality of inkjet printers is configured to receive image content data for a print job, identify a first number of inkjet operations for each inkjet in the at least one printhead to print media sheets using the image content data for the print job in a first orientation, identify a second number of inkjet operations for each inkjet in the at least one printhead to print media sheets using the image content data for the print job in a second orientation, identify a first magnitude of cross-process direction displacement error using the first number of inkjet operations and a cross-process direction displacement error previously measured for each inkjet, identify a second magnitude of cross-process direction displacement error using the second number of inkjet operations and the cross-process direction displacement error previously measured for each inkjet, and transmit an identification of the orientation of the image content data associated with the smallest magnitude and the magnitude of the cross-process direction displacement error corresponding to the identified orientation. The system controller is operatively connected to each of the inkjet printers in the plurality of inkjet printers. The system controller is configured to receive a print job, send the print job to each inkjet printer, receive from each inkjet printer the identification of the orientation of the image content data associated with the smallest magnitude and the magnitude of the cross-process direction displacement error corresponding to the identified orientation, compare the magnitudes of the cross-process direction displacement error received from each of the inkjet printers to identify the inkjet printer that send the smallest magnitude of the cross-process direction displacement error, and send to the inkjet printer that sent the smallest magnitude of the cross-process direction displacement error an instruction to print the print job.

BRIEF DESCRIPTION OF THE DRAWINGS

The foregoing aspects and other features of a color inkjet printer and color inkjet printer operational method that reduces the likelihood of inkjets developing cross-process direction error sufficient to require printhead maintenance are explained in the following description, taken in connection with the accompanying drawings.

DETAILED DESCRIPTION

For a general understanding of the environment for the printer and printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

Figure 5:
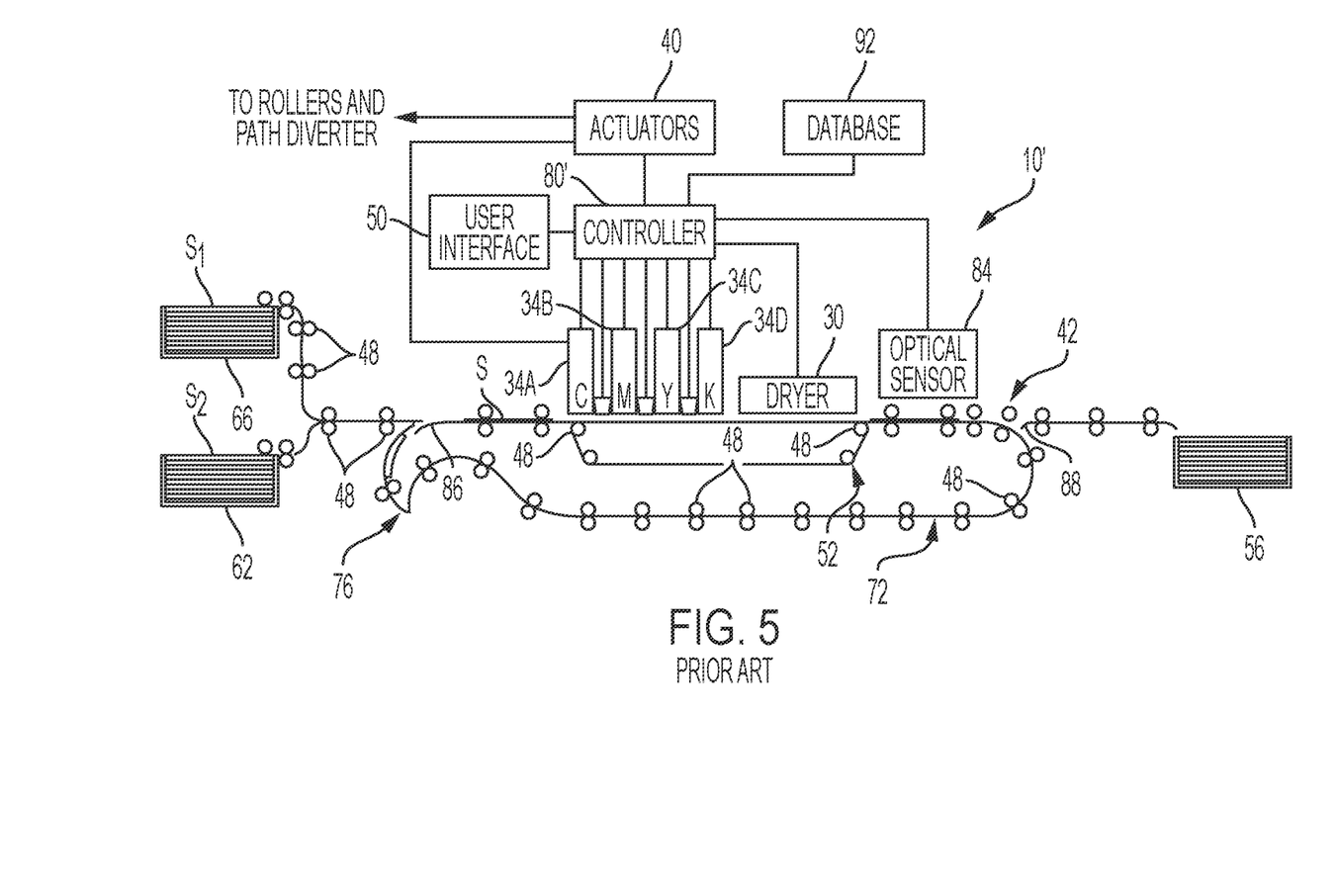
FIG. 5 is a schematic drawing of a prior art color inkjet printer that cannot compare orientations of image content data to reduce the cross-process direction displacement error in the printer.

FIG. 5 depicts a prior art high-speed color inkjet printer 10 that does not alter operation of the printer to reduce the likelihood of inkjets developing cross-process direction error. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone of the printer (shown in FIG. 6). In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 6:
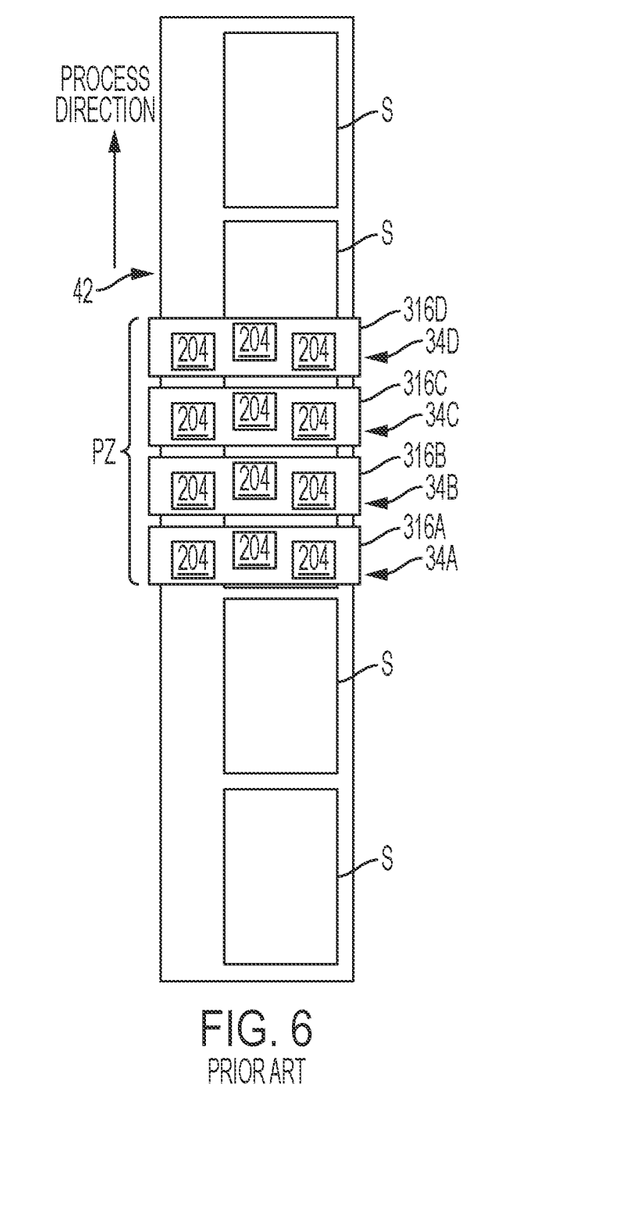
FIG. 6 depicts the print zone in the printer of FIG. 5.

The print zone PZ in the prior art printer 10 of FIG. 5 is shown in FIG. 6. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 6 has three printheads 204 mounted to a printhead carrier plate 316A, 316B, 316C, and 316D, respectively.

As shown in FIG. 5, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 5, a substrate from media transport 42 is diverted to the duplex path 72. Rotating the pivoting member 88 in the clockwise direction from the diverting position closes access to the duplex path 72 so substrates on the media transport move to the receptacle 56. While only one receptacle is shown in FIG. 5 to simply the figure, multiple receptacles are included in the printer with additional pivoting members that direct printed media sheets to different receptacles. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 5, the printed media sheets S not diverted to the duplex path 72 are carried by the media transport to the sheet receptacle 56 in which they are be collected. Before the printed sheets reach the receptacle 56, they pass by an optical sensor 84, which is also known as an inline image module (IIM). The optical sensor 84 generates image data of the printed sheets and this image data is analyzed by the controller 80. The controller 80 is configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop had an appropriate mass and the location of the ejected drop. Any inkjet not ejecting an ink drop it was supposed to eject or ejecting a drop not having the right mass or landing at an errant position is called an inoperative inkjet in this document. The controller can store data identifying the inoperative inkjets and a measurement of an errant drop in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets in each printhead and to identify the inoperative inkjets. The optical sensor can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 5 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Figure 1:
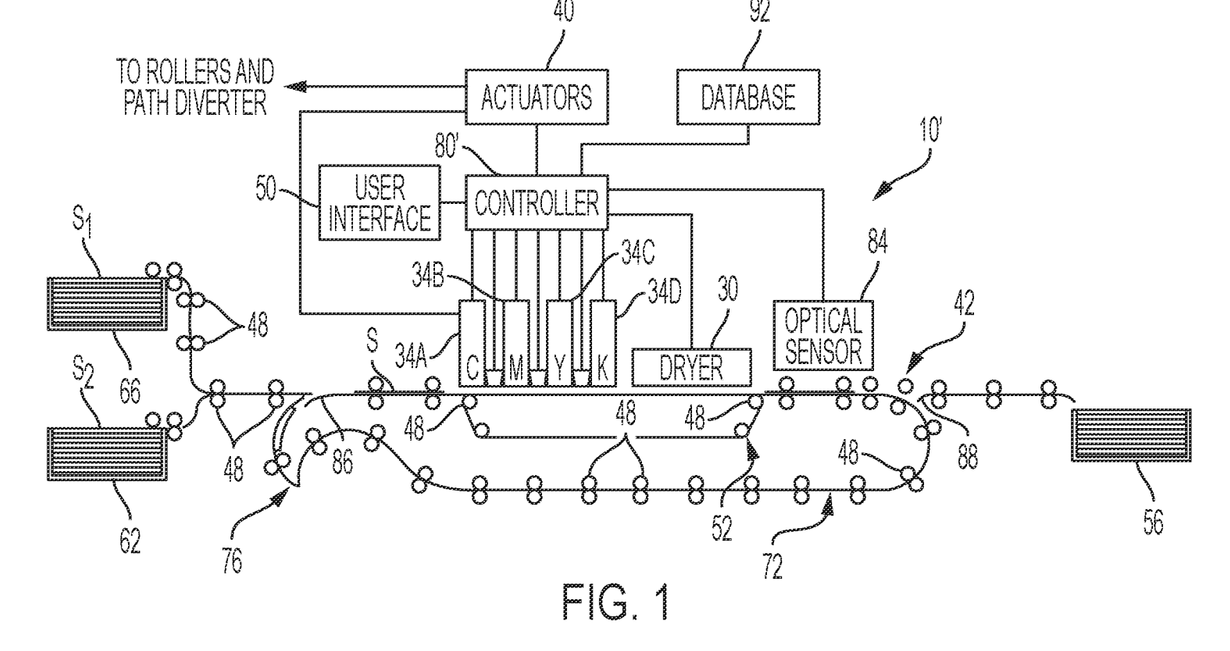
FIG. 1 is a schematic drawing of a color inkjet printer that reduces the likelihood of inkjets developing cross-process direction error and require printhead maintenance.

Using like reference numbers to identify like components, FIG. 1 depicts a high-speed color inkjet printer 10' in which the controller 80' has been configured to perform the process 200 described below to reduce the likelihood of inkjets developing cross-process direction error sufficient to require printhead maintenance. These actuators can be, for example, stepper motors that precisely move the rollers in the cross-process direction by a discrete number of inkjet positions as described more fully below.

As noted previously, the image data of the media sheets generated by the optical sensor 84 are analyzed to identify inoperative inkjets that are completely failing or that eject ink drops errantly. In the printer 10', the controller 80' not only identifies which inkjets are inoperative from the RTMJ sheets but it also identifies the cross-process direction displacement error for inkjets ejecting ink drops that deviate from the normal between the inkjet nozzle and the image receiving surface in the cross-process direction as noted previously with reference to FIG. 7. As used in this document, the term "cross-process direction displacement error" means the distance in the cross-process direction between a normal between an inkjet nozzle and a portion of an image receiving surface directly opposite the inkjet nozzle and a position where an ink drop ejected from the inkjet nozzle lands. The identification of the inkjets and the identified cross-process direction displacement error for each inkjet are stored in a database 92. For each inkjet, the controller 80' identifies the cross-process direction displacement error using the test pattern printed on an RTMJ sheet. As used in this document, the term "inkjet operation" refers to operating the inkjet to eject a drop of ink.

After determining the effect of the number of inkjet operations in the coming print job for at least two predetermined orientations of the image content data on the current cross-process direction displacement error for an inkjet, the controller selects the image content data orientation that results in the smallest increase in the magnitude of the cross-process direction displacement error for the printer and uses that orientation of the image content data to operate the printer. The determination of which image content data orientation is to be used to operate the printer occurs only at the start of a print job. This timing of the orientation determination enables the printer to direct the media sheets corresponding to a particular orientation to the same output receptacle so the operator does not need to separate the differently oriented printed sheets. By selecting the image content data orientations that adversely affect the aggregate cross-process direction displacement error for the printer the least, the intervals between printhead maintenance operations are reduced so purging occurs less frequently. Avoidance of purging is especially advantageous because that process uses ink for a purpose other than image printing. Accumulations of such unproductive ink loss can affect the economic efficiency of a printer.

Figure 4A:
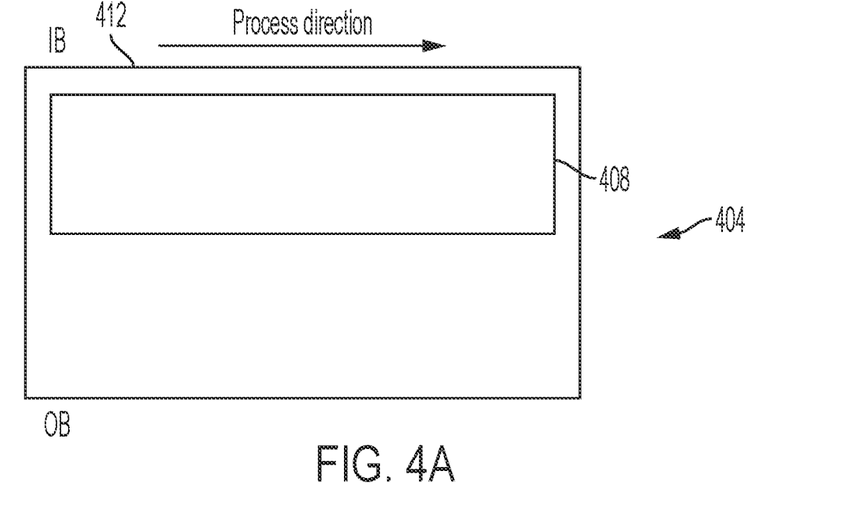
FIG. 4A is a first orientation of image content data having a solid coverage area on the inboard side of the image with reference to the process direction and FIG. 4B is the image content data of FIG. 4A after it has been rotated 180° with respect to the process direction.
Figure 4B:
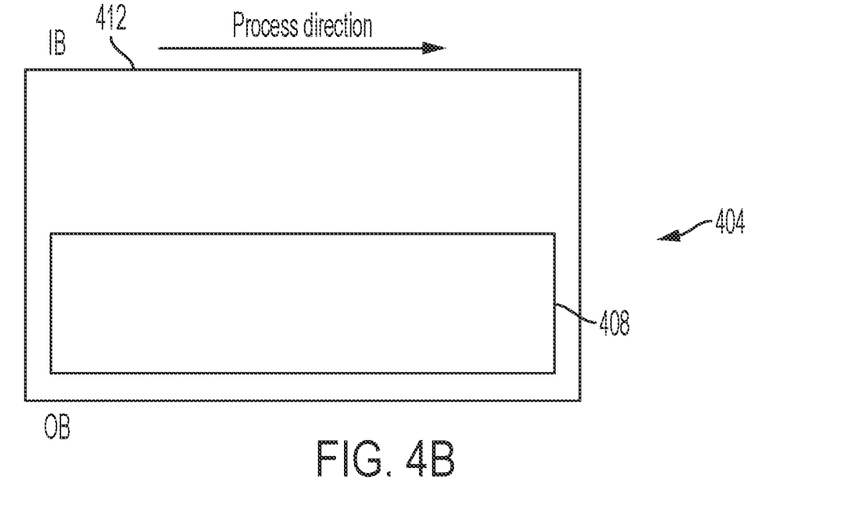

As used in this document, the term "orientation" refers to a rotation of image content data about the center of the image content data from a first generation of the color separation data that is used to generate the firing signals for printing an ink image corresponding to the image content data. For example, FIG. 4A is a first orientation of image content data 404 having a solid coverage area 408 on the inboard side 412 of the image with reference to the process direction P. FIG. 4B depicts the image content data of FIG. 4A after it has been rotated 180° with respect to the process direction. Now the solid coverage area is on the outboard side and the leading edge has become the trailing edge.

Figure 2:
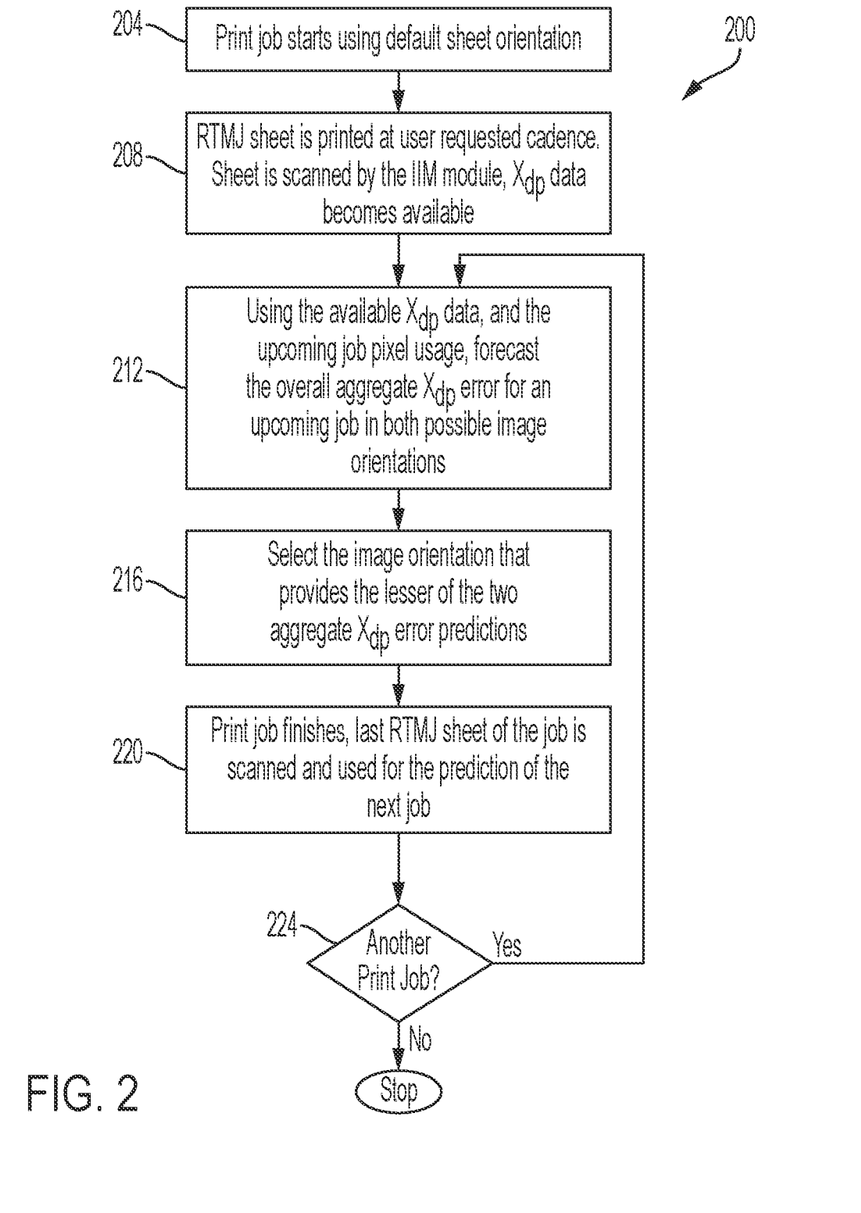
FIG. 2 is a flow diagram of a process for operating the printer of FIG. 1 to reduce the likelihood of inkjets developing cross-process direction error and requiring printhead maintenance.

FIG. 2 depicts a flow diagram for a process 200 that operates the printer 10' to compare and select from different image content data orientations to perform a print job so the interval between printhead maintenance is increased. In the discussion below, a reference to the process 200 performing a function or action refers to the operation of a controller, such as controller 80', to execute stored program instructions to perform the function or action in association with other components in the printer. The process 200 is described as being performed with the printer 10' of FIG. 1 for illustrative purposes.

The process 200 of operating the printer 10' begins with a default orientation of the image content data being used to print a print job following a printhead maintenance operation (block 204). Each RTMJ sheet that is printed during the print job at user selected intervals is imaged by the optical sensor 84 and the cross-process direction pixel data for each inkjet in the printer is measured and stored in the database 92 in association with an identifier for each inkjet (block 208). At the beginning of the next print job, the process uses the cross-process direction pixel data and pixel data for the next print job to identify the magnitude of the cross-process direction displacement error in the printer for at least two different orientations of the image content data (block 212). In one embodiment, this magnitude for each of the at least two different orientations of the image content data for the next print job is identified using the number of inkjet operations for each inkjet in the printer for the at least two different orientations of the image content data for the next print job and an estimation of the effect that number of inkjet operations has on the current cross-process direction displacement error for each inkjet. In one embodiment, the two different orientations are a 0° orientation, i.e., no rotation of the image content data, and a 180° orientation of the image content data. In one embodiment, the number of inkjet operations for each inkjet for an orientation of image content data is multiplied by an displacement error factor. The displacement error factor is defined as a predetermined increase in cross-process direction displacement error per a predetermined number of inkjet operations. In one embodiment, the displacement error factor is 8 μm/100 K inkjet operations. The total increase in cross-process direction displacement error for all of the inkjets for each orientation are compared and the image content data orientation yielding the smallest total increase in error is selected for operating the printer during the next print job (block 216). The print job ends with a RTMJ sheet being printed and the cross-process direction displacement error for each inkjet is measured and stored in the database so it can be used to evaluate the effect of the different data orientations for the next print job (block 220). Once the last print job is finished (block 224), the process is finished.

Figure 3A:
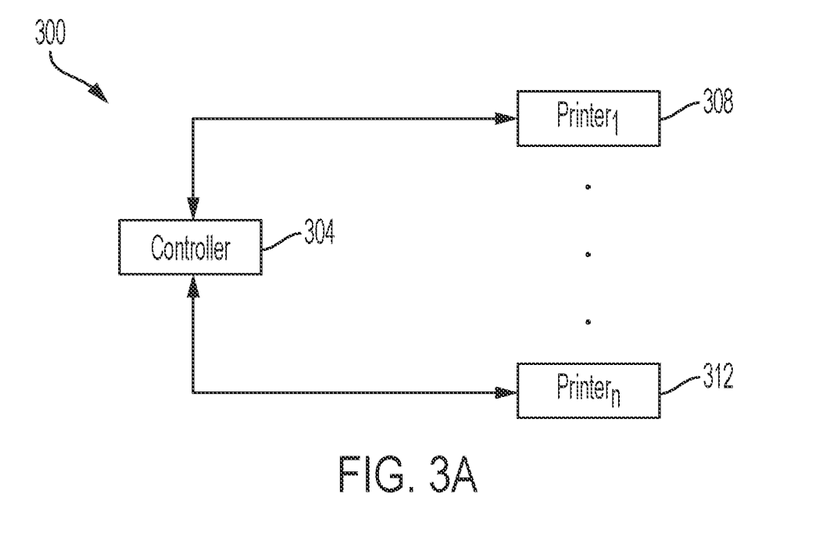
FIG. 3A is a block diagram of a multi-printer site that is operated in a manner that reduces the likelihood of inkjets developing cross-process direction displacement to a degree that requires printhead maintenance and FIG. 3B is a flow diagram of a process for operating the multi-printer site of FIG. 3A.
Figure 3B:
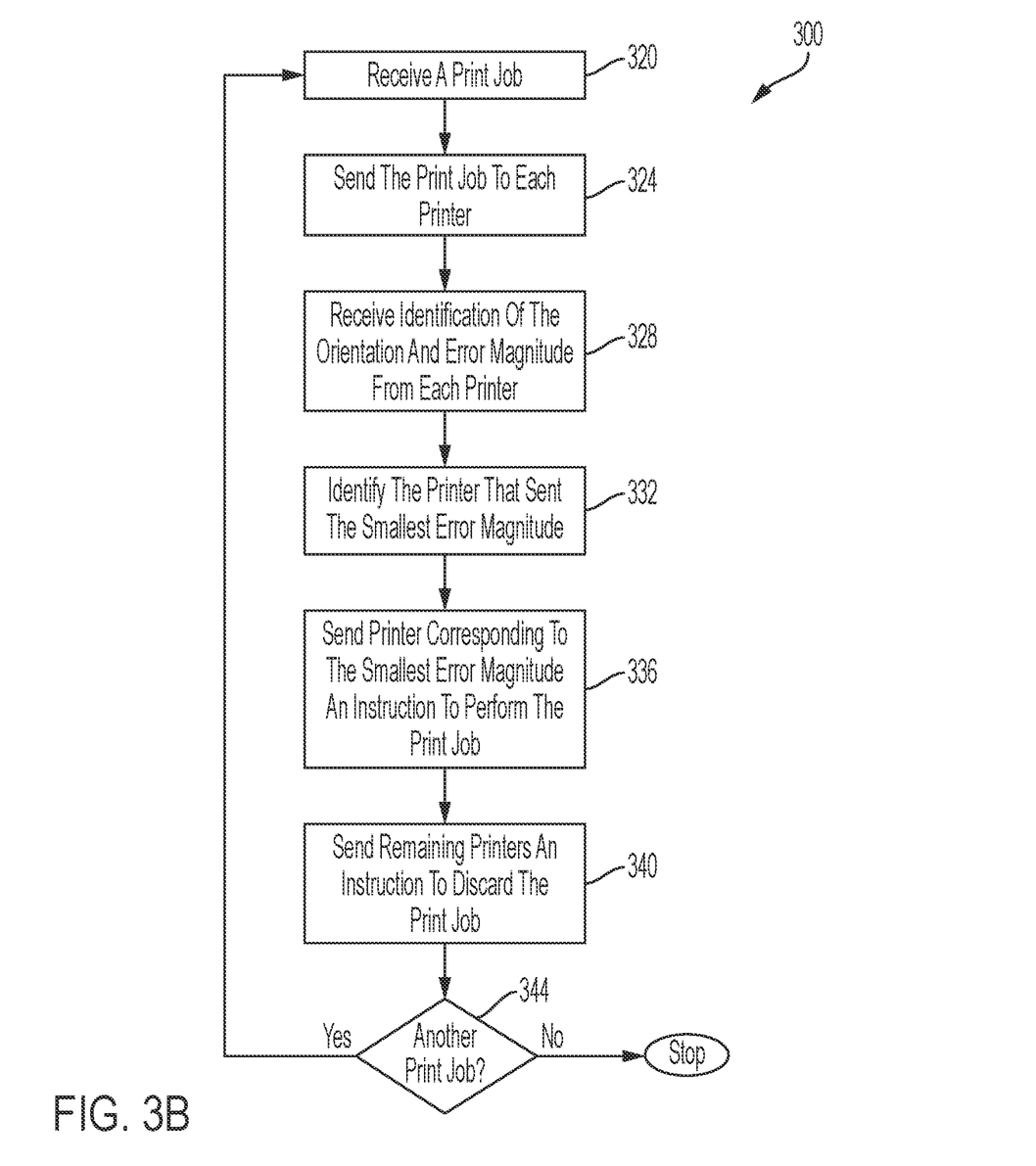

FIG. 3A is a block diagram of a single facility that has multiple printers configured as described above and shown in FIG. 1 and FIG. 2. In this configuration, the system 300 has a system controller 304 that is operatively connected to the multiple printers, $Printer_1$ to $Printer_n$, each of which is configured as previously described. System controller 304 is operatively connected to a source of print jobs so it receives each print job. To determine which printer receives the print job, the system controller 304 executes the process shown in FIG. 3B. Once the system controller 304 receives a print job (block 320), it sends the print job to each of the printers so each printer performs the process of FIG. 2 except each printer is configured to not select the orientation having the smallest magnitude cross-process direction displacement error for the printing of the print job (block 324). Instead, each printer returns to the controller 304 an identification of the orientation that would be selected by the printer to perform the print job and the magnitude of the cross-process direction displacement error corresponding to that orientation (block 328). The controller 304 then determines the printer corresponding to the smallest error magnitude (block 332) and sends a signal to that corresponding printer with an instruction to perform the print job (block 336). The other printers are sent an instruction to discard the print job (block 340). This process continues until no further print jobs are received (block 344). Of course, any printers sending a magnitude of cross-process direction displacement error that exceeds a threshold indication of printhead maintenance being required for the printer are taken offline so the controller does not send any print jobs to that printer during the maintenance procedure.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of operating an inkjet printer having at least one printhead comprising:
   receiving image content data for a print job;
   identifying a first number of inkjet operations for each inkjet in the at least one printhead to print media sheets using the image content data for the print job in a first orientation;
   identifying a second number of inkjet operations for each inkjet in the at least one printhead to print media sheets using the image content data for the print job in a second orientation;
   identifying a first magnitude of cross-process direction displacement error using the first number of inkjet operations and a cross-process direction displacement error previously measured for each inkjet;
   identifying a second magnitude of cross-process direction displacement error using the second number of inkjet operations and the cross-process direction displacement error previously measured for each inkjet; and
   operating the at least one printhead with the orientation of the image content data associated with the smallest magnitude.

2. The method of claim 1 wherein the first orientation is a 0° rotation of the image content data and the second orientation is a 180° rotation of the image content data.

3. The method of claim 2 further comprising:
   identifying a first increase in cross-process direction displacement error for each inkjet from the previously measured cross-process direction displacement error for each inkjet using the first number of inkjet operations and a displacement error factor; and
   identifying a second increase in cross-process direction displacement error for each inkjet from the previously measured cross-process direction displacement error for each inkjet using the second number of inkjet operations and the displacement error factor.

4. The method of claim 3 wherein the displacement error factor is defined as a predetermined increase in cross-process direction displacement error per a predetermined number of inkjet operations.

5. The method of printer of claim 4 wherein the displacement error factor is 8 μm/100 K inkjet operations.

6. The method of claim 4 further comprising:
   identifying the first magnitude by summing all of the first increases in the cross-process direction displacement error for all of the inkjets; and
   identifying the second magnitude by summing all of the second increases in the cross-process direction displacement error for all of the inkjets.

7. An inkjet printer comprising:
   at least one printhead;
   a media transport configured to move media sheets past the at least one printhead;
   an image sensor configured to generate image data of one of the media sheets after the one media sheet has passed the at least one printhead; and
   a controller operatively connected to the image sensor, the at least one printhead, and the media transport, the controller is configured to:
      receive image content data for a print job;
      identify a first number of inkjet operations for each inkjet in the at least one printhead to print media sheets using the image content data for the print job in a first orientation;
      identify a second number of inkjet operations for each inkjet in the at least one printhead to print media sheets using the image content data for the print job in a second orientation;
      identify a first magnitude of cross-process direction displacement error using the first number of inkjet operations and a cross-process direction displacement error previously measured for each inkjet;
      identify a second magnitude of cross-process direction displacement error using the second number of inkjet operations and the cross-process direction displacement error previously measured for each inkjet; and
      operate the at least one printhead with the orientation of the image content data associated with the smallest magnitude.

8. The inkjet printer of claim 7 wherein the first orientation is a 0° rotation of the image content data and the second orientation is a 180° rotation of the image content data.

9. The inkjet printer of claim 8, the controller being further configured to:
   identify a first increase in cross-process direction displacement error for each inkjet from the previously measured cross-process direction displacement error for each inkjet using the first number of inkjet operations and a displacement error factor; and
   identify a second increase in cross-process direction displacement error for each inkjet from the previously measured cross-process direction displacement error for each inkjet using the second number of inkjet operations and the displacement error factor.

10. The inkjet printer of claim 9 wherein the displacement error factor is defined as a predetermined increase in cross-process direction displacement error per a predetermined number of inkjet operations.

11. The inkjet printer of claim 10 wherein the displacement error factor is 8 μm/100 K inkjet operations.

12. The inkjet printer of claim 10, the controller being further configured to:
   identify the first magnitude by summing all of the first increases in the cross-process direction displacement error for all of the inkjets; and
   identify the second magnitude by summing all of the second increases in the cross-process direction displacement error for all of the inkjets.

13. A system of inkjet printers comprising:
   a plurality of inkjet printers and a system controller operatively connected to each inkjet printer in the plurality of inkjet printers, each inkjet printer in the plurality of inkjet printers comprising:
      at least one printhead;
      a media transport configured to move media sheets past the at least one printhead;
      an image sensor configured to generate image data of one of the media sheets after the one media sheet has passed the at least one printhead; and a controller operatively connected to the image sensor, the at least one printhead, and the media transport, the controller is configured to:
  receive image content data for a print job;
  identify a first number of inkjet operations for each inkjet in the at least one printhead to print media sheets using the image content data for the print job in a first orientation;
  identify a second number of inkjet operations for each inkjet in the at least one printhead to print media sheets using the image content data for the print job in a second orientation;
  identify a first magnitude of cross-process direction displacement error using the first number of inkjet operations and a cross-process direction displacement error previously measured for each inkjet;
  identify a second magnitude of cross-process direction displacement error using the second number of inkjet operations and the cross-process direction displacement error previously measured for each inkjet; and
  transmit an identification of the orientation of the image content data associated with the smallest magnitude and the magnitude of the cross-process direction displacement error corresponding to the identified orientation; and the system controller is operatively connected to each of the inkjet printers in the plurality of inkjet printers, the system controller being configured to:
  receive a print job;
  send the print job to each inkjet printer;
  receive from each inkjet printer the identification of the orientation of the image content data associated with the smallest magnitude and the magnitude of the cross-process direction displacement error corresponding to the identified orientation;
  compare the magnitudes of the cross-process direction displacement error received from each of the inkjet printers to identify the inkjet printer that send the smallest magnitude of the cross-process direction displacement error; and
  send to the inkjet printer that sent the smallest magnitude of the cross-process direction displacement error an instruction to print the print job.

14. The system of claim 13, the system controller being configured to:
  send to the inkjet printers that did not send the smallest magnitude of the cross-process direction displacement error an instruction to discard the print job.

15. The system of claim 13 wherein in each inkjet printer in the plurality of inkjet printers, the first orientation is a 0° rotation of the image content data and the second orientation is a 180° rotation of the image content data.

16. The system of claim 15, the controller in each inkjet printer in the plurality of inkjet printers being further configured to:
  identify a first increase in cross-process direction displacement error for each inkjet from the previously measured cross-process direction displacement error for each inkjet using the first number of inkjet operations and a displacement error factor; and
  identify a second increase in cross-process direction displacement error for each inkjet from the previously measured cross-process direction displacement error for each inkjet using the second number of inkjet operations and the displacement error factor.

17. The system of claim 16 wherein the displacement error factor is defined as a predetermined increase in cross-process direction displacement error per a predetermined number of inkjet operations.

18. The system of claim 17 wherein the displacement error factor is 8 µm/100 K inkjet operations.

19. The system of claim 18, the controller being further configured to:
  identify the first magnitude by summing all of the first increases in the cross-process direction displacement error for all of the inkjets; and
  identify the second magnitude by summing all of the second increases in the cross-process direction displacement error for all of the inkjets.

20. The system of claim 19, the system controller being configured to:
  determine whether the magnitude of the cross-process direction displacement error received from any inkjet printer exceeds a threshold for printhead maintenance; and
  identify each inkjet printer that sent the magnitude of the cross-process direction displacement error that exceeded the threshold for printhead maintenance as being offline.

* * * * *